March 3, 1970  R. L. WEAVER ET AL  3,498,479
AUGER WITH ANGULARLY CUTTING BLADES FOR SILO UNLOADER
Original Filed July 25, 1966  3 Sheets-Sheet 1
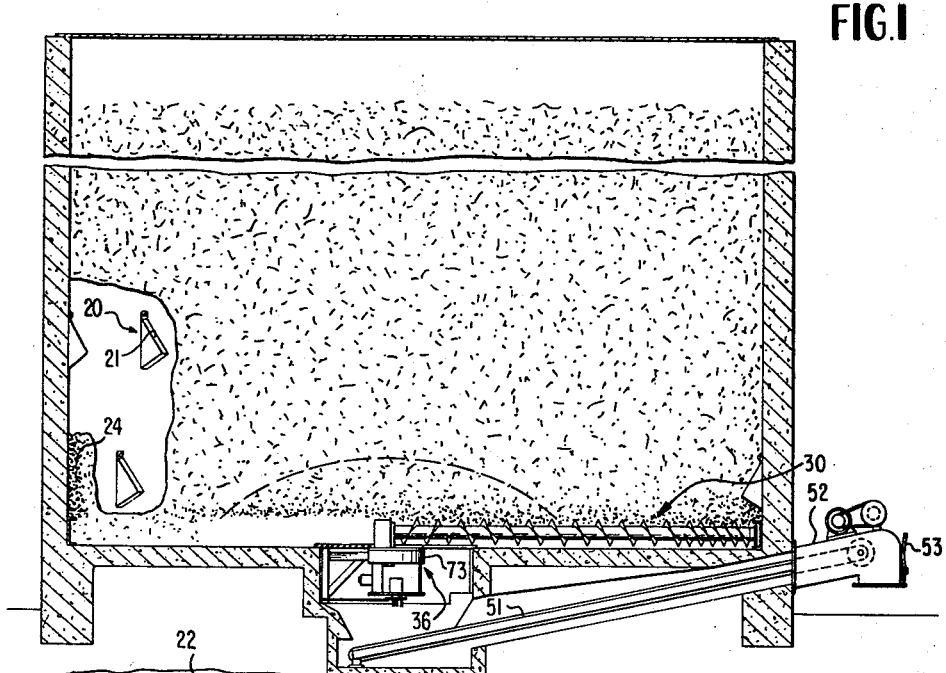
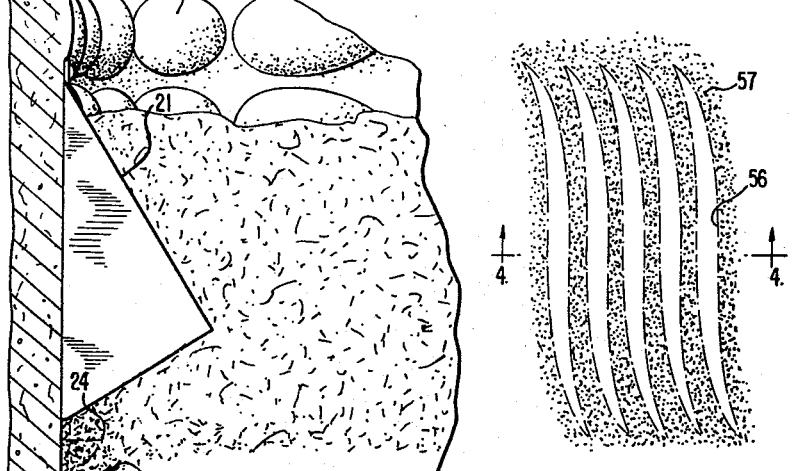
INVENTORS
RICHARD L. WEAVER
BENJAMIN K. SMOKER
BY Wynne & Tinken
ATTORNEYS

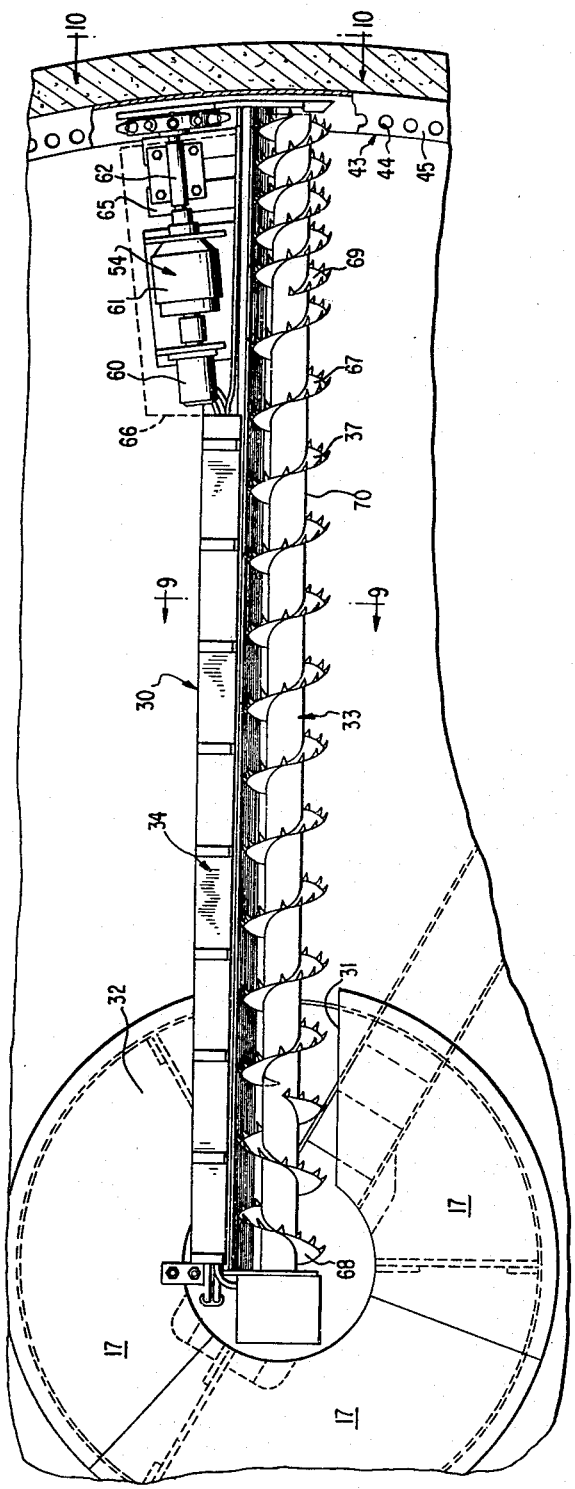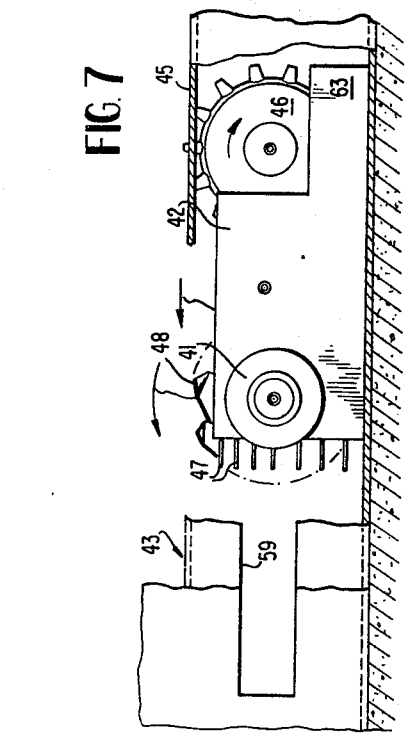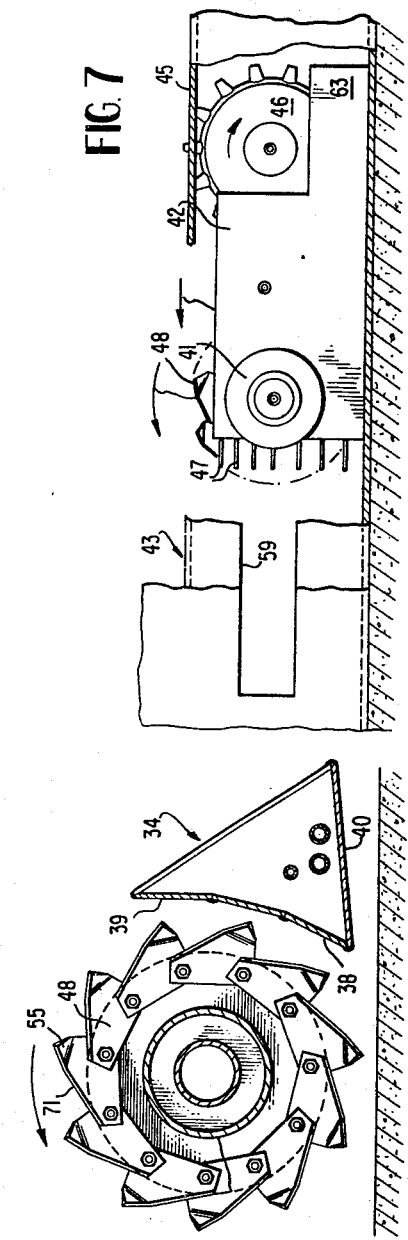
INVENTORS
RICHARD L. WEAVER
BENJAMIN K. SMOKER
BY
*Wynne & Finken*
ATTORNEYS

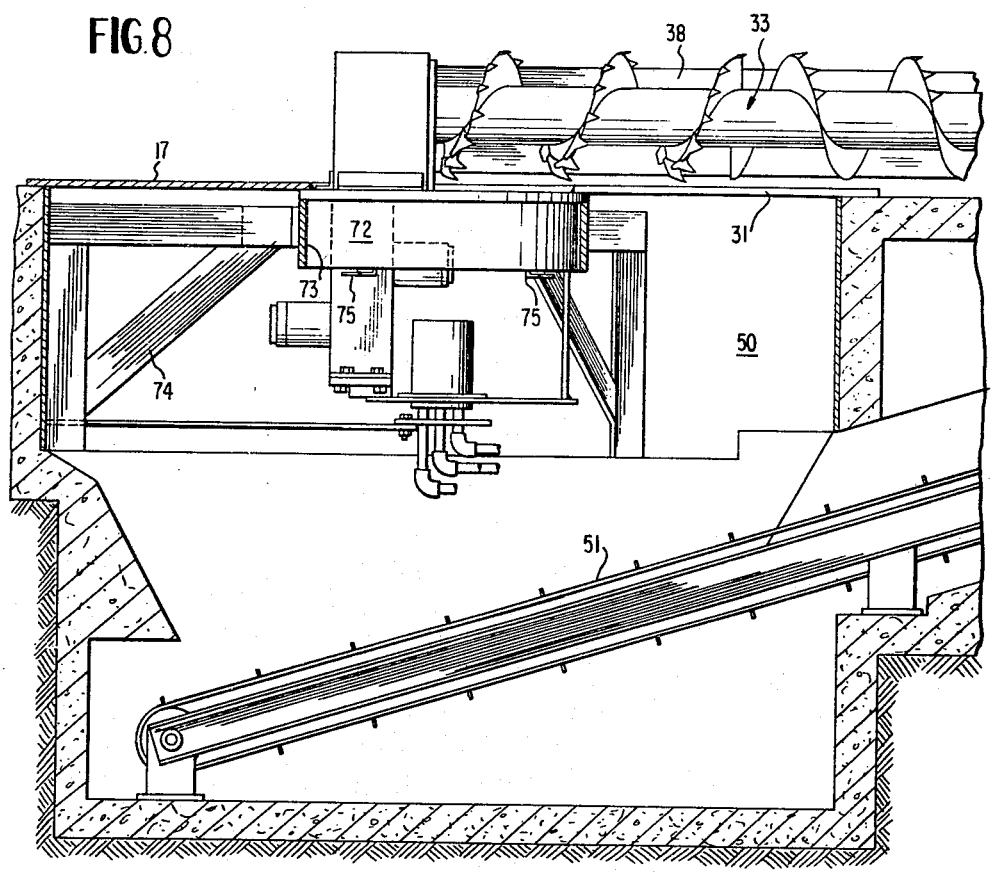

United States Patent Office 3,498,479
Patented Mar. 3, 1970

3,498,479
AUGER WITH ANGULARLY CUTTING BLADES
FOR SILO UNLOADER
Richard L. Weaver, Rte. 1, and Benjamin K. Smoker,
Rte. 3, both of Myerstown, Pa. 17067
Original application July 25, 1966, Ser. No. 567,722, now
Patent No. 3,391,809. Divided and this application
July 8, 1968, Ser. No. 743,082
Int. Cl. B65g 65/46
U.S. Cl. 214—17    2 Claims

ABSTRACT OF THE DISCLOSURE

An auger for unloading a silo having angularly cutting blades is provided which is particularly useful in bottom silo unloading operations, the blades extending from the periphery of the spiral rib of the auger, with each blade including an angularly extending outer tip which extends toward an end of the auger to produce annular angular cuts in the silage.

---

This application is a division of application Ser. No. 567,722 filed July 25, 1966, now Patent No. 3,391,809, entitled, Silo Bottom Unloader System.

An auger with angularly extending cutting blades is provided for facilitating downward silage flow for bottom silo unloading operations.

Tremendous forces are encountered in the handling of a mass of silage. A large silo 24 feet in diameter and 70 feet high filled with silage having a moisture content of 70 percent contains about 950 tons of material. Silage of different materials and moisture content produce varying problems in the design of silo unloaders. Considerable attention has been given to the unloading of silos from the top since many engineering problems inherent in the tremedous forces at the bottom of the silo are thereby avoided.

The development of bottom unloaders for silos has been in the direction of accepting the tremendous forces encountered as an unavoidable problem ot be overcome by high powered, heavy equipment. With the advance in silo technology, bigger silos are becoming wise investments and the problems of bottom unloading have become more severe.

These and further objects and advantages of the present invention will become more apparent upon reference to the following specification, appended claims and drawing wherein:

FIG. 1 is a side view in section of the silo unloader system;

FIG. 2 is an enlarged view of a portion of the silage conditioning means and auger means;

FIG. 3 is a view looking upwardly into the silage mass showing the cutting pattern of the auger and its teeth;

FIG. 4 is a view taken on line 4—4 of FIG. 3;

FIG. 5 is a top view of the auger means;

FIG. 6 is a view taken on line 9—9 of FIG. 5;

FIG. 7 is a view taken on line 10—10 of FIG. 5 with parts cut away for clarity; and FIG. 8 is an enlarged view of the central opening area in the floor of the silo.

The auger 33 includes a main outer flight 37 which moves the silage beneath it and into engagement with a guide plate 38 which directs further silage movement toward the opening 31, the guide plate 38 being in substantially the form of a quarter circle with an upper vertical extension 39 terminating below the top of the auger. The arm 34 has a bottom surface 40 which extends upwardly toward its trailing portion to facilitate movement and particularly to reduce the power needed to start the sweeping action. The guide plate is provided with the low profile vertical upper portion 39 to enable the overflow of silage, thereby providing a release or safety valve type action. The outer end of the auger is rotatably mounted in the runner 42 through bearing 41. The runner 42 is arcuately formed to conform with the circular U-channel or track 43. The U-channel 43 has holes 44 in its top leg 45 which are engaged by a self-clearing cone-like or tapered toothed and tapered bodied drive wheel 46. The leading portion of the runner 42 is equipped with horizontally extending knives 47 which cut and shred silage within the U-channel. The auger is equipped with outwardly extending teeth 48 connected to the flights at positions which produce a tapered profile with the smallest end of the taper being positioned within the U-channel to allow the auger and its teeth 48 to cooperate with the knives 47 in maintaining a usable passageway for the runner (FIGS. 2 and 5). This construction avoids the buildup of a dense silage wedge ahead of the runner 42 which can overload and stop the sweep of the auger means. Non-cutting devices can produce such dense silage wedges; the cutting action of the knives and auger eliminates this problem. The guide plate 38 is spaced from the auger to define a tapered space which is larger at the inner than at the outer end to provide an increased capacity for handling the increased volume at the inner end.

Considering the system in more detail, it will be seen that the silage mass is horizontally compressed by the mounds 22 and smooth arms 21 of silage conditioning means 20 located close to the silo floor 27.

The auger means 30 includes a rotatable central support 36 having pie-shaped outer segments 17 covering the discharge passageway 50 in the floor 27 and defining the restricted radial opening 31 beneath the auger 33, thereby preventing silage from clogging the passageway 50 and insuring control over the discharge rate.

The silage falls through the restricted opening 31 onto an upwardly inclined belt conveyor 51 for discharge through the enclosed and valved discharge chute 52, the valve being indicated in FIG. 1 by numeral 53.

The sweep means 54 (FIG. 5) of the auger means 30 includes the drive wheel 46 with its central body tapered and cone-like teeth which clear the drive holes 44 in the top leg of the track 43. The top surface of the top leg provides the annular column forming means 23 which form the annular silage column 24. A separate angle bracket (not shown) may also be used to form the column forming ledge 23 which preferably has a width of about 2 to 3 inches. As shown, the preferred ledge 23 is formed by the U-channel which is connected to the outer bottom wall of the silo with the lower leg serving as a support for the runner 42 of the auger means 30.

The auger 33 (FIG. 6) is equipped with specially designed blades or teeth 48, each having an outer tip 55 which extends angularly away from and toward the outer end of the auger. These tips 55, as seen in FIGS. 3 and 4, are arranged to produce cuts 56 in the ceiling 57 of the silage mass with the deepest part of each cut overlapping the shallow part of an adjacent cut positioned radially outwardly therefrom. In this manner, the ceiling 57 of silage is undercut in an annular fashion to destroy any dome-like structure which may form and allow downward silage movement. Some silages will tend to form domes and when undercut in this fashion, collapse to the floor; in other silages, a progressive falling of the undercut portions occurs.

The auger 33 is mounted in bearing 41 in the curved runner 42 and, as seen in FIG. 7, a suitable slot 59 is provided in the track 43 for access to the lube fitting.

Sweep means 54 is mounted radially inwardly of the U-channel and includes a hydraulic motor 60 (FIG. 5), a reduction gear assembly 61, bearing 62 and the drive wheel 46 having self-clearing tapered conical teeth as seen in FIG. 7 extending outwardly from the tapered main body portion. The preferred conical design accomplishes continual clearing of the holes 44 of compacted silage and the tapered shape of the main body portion enables the extrusion of silage caught between the main body portion 46 and the undersurface of the top leg of the track. It will be noted in FIG. 7 that the sweep means 54 is radially oriented and not parallel to the radially oriented auger 33. The runner 42 has a bottom rearward extension 63 positioned below the center line of the wheel 46; this extension 63 acts as a brace against tipping forces on the runner.

The sweep means 54 is adjustably mounted on a framework 65 of auger arm 34. Arm 34 is welded or otherwise connected at one end to the runner 42 and extends radially inwardly and is connected at its inner end to the rotatable central support 36. The sweep means 54 is provided with a cover or housing 66, as indicated in dotted lines in FIG. 5, to protect it from silage.

The auger 33, as seen in FIG. 5, includes a main spiral rib or flight 67 which extends inwardly from the runner 42 to the support 36 with an auxiliary reverse spiral rib 68 extending from the center of the central support 36 outwardly to the main spiral rib, this auxiliary rib 68 serving to clear the top of the rotatable central support 36. It will be noted that the two ribs or flights meet each other at a point about midway along the length of the radial slot 31. At the outer end of the auger 33, a second auxiliary spiral rib 69 is added to the auger shaft 70 to aid the main spiral rib 67 in clearing the critical outer annular zone of the silo. Preferably the auxiliary rib 69 extends about 2 to 4 feet from the outer end of the auger shaft 70 for augers having lengths of about 12 to 20 feet.

Because some silages tend to become further compacted rather than displaced by a smooth edge auger, teeth or blades 48 have been added to the ribs to aid in the silage movement. While teeth of normal design sometimes improve the operation, certain types of silage still present difficult problems of removal. Teeth 48 which are bolted in overlapped interlocked relation (FIG. 6) to the ribs are of a unique design which results in an angular cutting away from the dome or downwardly facing surface of the silage. The teeth are angled from the plane of the auger ribs to undercut and break away chunks of silage from its connection with the main body of silage. The teeth are curved for face-to-face attachment to the ribs, as shown in FIG. 6, and each tooth has a long forward cutting edge 71, the outermost end or one third of the length and point thereof being bent toward the outer end of the auger. The teeth used at the outer end of the auger are preferably tipped with carbide material for longer life. As seen in FIG. 2, the outwardly inclined triangular tip on the teeth overhangs and clears the silage above the auger bearing 41 and within track 43.

The inner end of the auger 33 is rotatably mounted on the central support 36 which includes a horizontal top plate 17 and depending annular skirt 72; the top plate 17 rests on the top edge of an annular bearing 73 (FIG. 8) with the skirt 72 rotatably received within the bearing. Suitable support framework 74 connects the annular bearing 73 to the concrete silo. Lock angles 75 are bolted to the bottom of the skirt 72 and project under the lower edge of the bearing 73 to prevent upward movement of the sweeping auger means.

We claim:

1. In a silo bottom unloader system for a silo having an upright wall and a bottom floor with an opening, an auger means including an auger for delivering silage to said opening, rotating means for rotating said auger about its own axis, and sweep means for driving said auger about said bottom floor; said auger having a spiral rib along its length, blades extending from the periphery of said rib, each blade having a base portion connected to the rib, an intermediate portion having a forward cutting edge, and an outer tip extending toward an end of the auger to produce annular angular cuts in the silage and thereby facilitate downward silage movement, the blades being spaced along the periphery of said rib and constructed and arranged to pass through common vertical zones to produce annular cuts in silage wherein the deepest part of each cut is positioned horizontally beyond the shallowest part of an adjacent cut.

2. In a silo bottom unloader system as defined in claim 1, and wherein said base portion of each blade is in face-to-face engagement with adjacent blades and the intermediate portions and outer tips of the blades define the entire spiral periphery of the auger.

References Cited
UNITED STATES PATENTS

| | | | |
|---|---|---|---|
| 301,506 | 7/1884 | Massey | 198—213 |
| 3,237,788 | 3/1966 | Weaver et al. | |

ROBERT G. SHERIDAN, Primary Examiner

U.S. Cl. X.R.

198—213